United States Patent
Klee et al.

(10) Patent No.: US 12,126,208 B2
(45) Date of Patent: Oct. 22, 2024

(54) METHOD FOR ADAPTIVELY FAST-CHARGING A BATTERY PACK USING STORED LIMIT VALUES

(71) Applicant: Robert Bosch GmbH, Stuttgart (DE)

(72) Inventors: Christoph Klee, Stuttgart (DE); Andreas Gonser, Wolfschlugen (DE); Marc-Alexandre Seibert, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 509 days.

(21) Appl. No.: 17/442,959

(22) PCT Filed: Mar. 18, 2020

(86) PCT No.: PCT/EP2020/057367
§ 371 (c)(1),
(2) Date: Sep. 24, 2021

(87) PCT Pub. No.: WO2020/193296
PCT Pub. Date: Oct. 1, 2020

(65) Prior Publication Data
US 2022/0190624 A1     Jun. 16, 2022

(30) Foreign Application Priority Data
Mar. 28, 2019   (DE) ..................... 10 2019 204 362.3

(51) Int. Cl.
*H02J 7/00*   (2006.01)

(52) U.S. Cl.
CPC .... *H02J 7/007182* (2020.01); *H02J 7/00032* (2020.01); *H02J 7/0045* (2013.01); *H02J 7/0047* (2013.01); *H02J 7/007194* (2020.01)

(58) Field of Classification Search
CPC ................................................ H02J 7/007182
(Continued)

(56) References Cited

U.S. PATENT DOCUMENTS

| | | | |
|---|---|---|---|
| 2006/0087286 A1* | 4/2006 | Phillips | H01M 10/441 320/114 |
| 2013/0162196 A1* | 6/2013 | Li | H02J 7/00714 320/107 |

(Continued)

FOREIGN PATENT DOCUMENTS

| | | |
|---|---|---|
| DE | 10 2016 209 822 A1 | 12/2017 |
| EP | 2 961 025 A1 | 12/2015 |
| EP | 3 109 654 A1 | 12/2016 |

OTHER PUBLICATIONS

International Search Report corresponding to PCT Application No. PCT/EP2020/057367, mailed Jun. 25, 2020 (German and English language document) (5 pages).

*Primary Examiner* — Yalkew Fantu
(74) *Attorney, Agent, or Firm* — Maginot, Moore & Beck LLP (57) ABSTRACT

The disclosure relates to a method for adaptively fast-charging a battery pack using a battery charging device. At least one voltage and the temperature of the battery pack are continuously or periodically detected by means of a detection unit. A charging current of the battery charging device is adapted by means of a control and/or regulating unit of the battery charging device on the basis of the detected voltage and/or the detected temperature of the battery pack. At least one battery-specific threshold of the voltage and/or the temperature is taken into consideration in order to adapt the charging current by means of the control and/or regulating unit. Prior to starting the charging process, the battery-specific threshold of the voltage and/or the temperature is transmitted from a memory unit of the battery pack and/or the battery charging device to the control and/or regulating unit by means of a communication unit.

17 Claims, 3 Drawing Sheets

(58) Field of Classification Search
USPC .......................................................... 320/151
See application file for complete search history.

(56) References Cited

U.S. PATENT DOCUMENTS

2015/0372512 A1* 12/2015 Umemura ............. H02J 7/0071
320/112
2017/0353041 A1* 12/2017 Klee ......................... B25F 5/02

* cited by examiner

METHOD FOR ADAPTIVELY FAST-CHARGING A BATTERY PACK USING STORED LIMIT VALUES

This application is a 35 U.S.C. § 371 National Stage Application of PCT/EP2020/057367, filed on Mar. 18, 2020, which claims the benefit of priority to Serial No. DE 10 2019 204 362.3, filed on Mar. 28, 2019 in Germany, the disclosures of which are incorporated herein by reference in their entirety.

BACKGROUND

A method for adaptive fast charging of a battery pack by way of a battery charger has already been proposed, wherein, in at least one method step, at least one voltage and one temperature of the battery pack are acquired continuously or periodically by way of an acquisition unit, and wherein, in at least one method step, a charging current of the battery charger is adapted by way of a control and/or regulation unit of the battery charger on the basis of the acquired voltage and/or of the acquired temperature of the battery pack, wherein, in at least one method step, at least one limit value of the voltage and/or of the temperature is taken into consideration by way of the control and/or regulation unit in order to adapt the charging current.

SUMMARY

The disclosure is based on a method for adaptive fast charging of a battery pack, in particular of an interchangeable battery pack for electric machine tools, by way of a battery charger, wherein, in at least one method step, at least one voltage and one temperature of the battery pack, in particular of a battery cell of the battery pack, are acquired continuously or periodically by way of an acquisition unit, and wherein, in at least one method step, a charging current of the battery charger is adapted by way of a control and/or regulation unit of the battery charger on the basis of the acquired voltage and/or of the acquired temperature of the battery pack, wherein, in at least one method step, at least one limit value, in particular typical for the battery, of the voltage and/or of the temperature is taken into consideration by way of the control and/or regulation unit in order to adapt the charging current.

It is proposed, in at least one method step, in particular before the charging process is started, for the limit value, in particular typical for the battery, of the voltage and/or of the temperature to be transmitted from a storage unit of the battery pack and/or of the battery charger to the control and/or regulation unit by way of an in particular wireless communication unit.

The charging current of the battery charger is preferably adapted by way of the control and/or regulation unit on the basis of the acquired temperature and/or of the acquired voltage such that a total charging time of the battery pack is able to be kept low. The total charging time of the battery pack is preferably a time that is required to charge the battery pack from a starting state of charge to a predetermined end state of charge by way of the charger. Preferably, in at least one method step, an end state of charge is set and/or predefined by a user and/or an external unit. The voltage and/or the temperature is advantageously acquired by way of the acquisition unit on the battery pack. However, it is also conceivable for a voltage and/or a temperature of a battery cell of the battery pack to be acquired by way of the acquisition unit, wherein the charging current is in particular adapted on the basis of the voltage and/or of the temperature of the battery cell of the battery pack. The voltage and the temperature of the battery pack are preferably acquired by way of at least one acquisition element of the acquisition unit that is designed in particular in one piece with a reception interface, in particular with an electrical contact of the reception interface, of the battery charger. However, it is also conceivable for the voltage and/or the temperature of the battery pack and/or the charging current to be acquired by an in particular electronic acquisition unit of the battery pack that is arranged in the battery pack and to be transmitted to the battery charger via the reception interface. A "control and/or regulation unit" should be understood to mean in particular a unit having at least one set of control electronics. "Control electronics" should be understood to mean in particular a unit having a processor unit and having a storage unit and having an operating program stored in the storage unit. The limit value, in particular typical for the battery, of the voltage and/or of the temperature being taken into consideration in order to adapt the charging current should be understood to mean in particular that the charging current is adapted by way of the control and/or regulation unit when the limit value of the voltage and/or of the temperature is exceeded or fallen below. The acquired voltage and/or the acquired temperature are/is preferably compared periodically or continuously with the limit value of the voltage and/or of the temperature by way of the control and/or regulation unit. At least one limit value, in particular typical for the battery, of the voltage and/or temperature is preferably assigned to a value of the charging current. The value of the charging current is particularly preferably transmitted, together with the assigned limit value of the voltage and/or of the temperature, from the storage unit of the battery pack and/or of the battery charger to the control and/or regulation unit by way of the communication unit.

The battery pack is advantageously designed as an interchangeable battery pack for electric machine tools and comprises in particular at least one battery cell. The battery cell is preferably designed as a lithium-based battery cell, for example as a Li-ion battery cell, as a Li—Po battery cell or the like. It is conceivable for the method also to be able to be applied to other battery cells. A battery voltage of the battery pack preferably results from battery cells of the battery pack being interconnected. The battery pack preferably has a battery voltage of 3.6 V, 7.2 V, 10.8 V, 14.4 V, 18 V, 36 V or the like. An "electric machine tool" should be understood to mean in particular a device for machining workpieces by way of an electrically driven tool. By way of example, the electric machine tool is designed as a drilling machine, as a screwdriver, as a grinder, as a saw or the like.

Advantageously, in at least one method step, a value of the charging current is reduced to a further value following exceedance of the limit value, in particular typical for the battery, of the voltage and/or of the temperature. The limit value, in particular typical for the battery, of the voltage and/or of the temperature is preferably assigned to the value of the charging current. The value of the charging current is preferably transmitted, together with the limit value, in particular typical for the battery, of the voltage and/or of the temperature, from the storage unit of the battery pack and/or of the battery charger to the control and/or regulation unit. Preferably, in at least one, in particular further method step, at least one further limit value, in particular typical for the battery, of the voltage and/or of the temperature is taken into consideration in order to adapt the charging current that has the further value, this limit value in particular having a higher value than the limit value of the voltage and/or of the temperature, in particular from a previous method step. The further limit value, in particular typical for the battery, of the voltage and/or of the temperature is preferably assigned to the further value of the charging current. The further value of the charging current is preferably transmitted, together with the further limit value, in particular typical for the battery, of the voltage and/or of the temperature, from the storage unit of the battery pack and/or of the battery charger to the control and/or regulation unit.

In at least one method step, in particular when the charging current has a value of 6 A, in the event of a limit value of the voltage, which corresponds in particular to a voltage of at least 4.2 V, being exceeded, the battery pack is preferably charged with a constant voltage (CV phase), in particular independently of the limit value of the voltage and/or of the temperature. Preferably, in at least one method step, the charging current of the battery charger is acquired, in particular periodically or continuously, by way of the acquisition unit. A charging process of the battery pack preferably takes place with a constant voltage (CV phase) until another limit value of the charging current is fallen below. As an alternative, it is conceivable for the charging process to be ended in the event of the limit value of the voltage, which corresponds in particular to a voltage of at least 4.2 V, being exceeded. However, it is also conceivable for the charging process to be ended in the event of another limit value of the voltage and/or of the temperature being exceeded, this being predefined in particular by a user and/or an external unit. Preferably, in the event of a value of the acquired temperature of 60° C., particularly preferably 50° C., being exceeded, the charging process is terminated by way of the control and/or regulation unit.

The battery pack is advantageously charged in at least one method step following an in particular predefined sequence of steps, wherein some steps are performed in succession and, in the event of a limit value, assigned to the respective step, of the voltage and/or of the temperature being reached, the charging current is adapted in line with a value of the charging current in the respective next step. Preferably, in a first step, the battery pack is charged by the battery charger with an in particular maximum charging current. The maximum charging current is in particular a maximum permissible charging current for the battery pack. Advantageously, in at least one method step, in particular in the first step, in the event of a first limit value of the voltage and/or of the temperature being exceeded, the charging current is reduced in comparison with the maximum charging current, wherein there is a transition to a second step corresponding to a reduced value of the charging current. Preferably, in at least one method step, in particular in the second step, in the event of a second limit value of the voltage and/or of the temperature being exceeded, the charging current is reduced further in comparison with the first step, wherein there is a transition to a third step corresponding to a reduced further value of the charging current. Advantageously, each step in the sequence of steps has at least one limit value of the voltage and/or of the temperature.

A first exemplary sequence of steps, in a first step, has a charging current of 8 A, wherein, in the event of a value of the acquired voltage of 4.1 V being exceeded or a value of the acquired temperature of 45° C. being exceeded, the charging current is reduced to a value of 6 A. In a second step of the first exemplary sequence of steps, in the event of a value of the acquired voltage of 4.2 V being exceeded, the battery pack is charged further in a third step with a constant voltage of 4.2 V. If, in the third step, a value of the charging current of 100 mA is fallen below, the charging process is ended. A second exemplary sequence of steps, in a first step, has a charging current of 12 A, wherein, in the event of a value of the acquired voltage of 3.9 V being exceeded or a value of the acquired temperature of 40° C. being exceeded, the charging current is reduced to a value of 6 A. In a second step of the second exemplary sequence of steps, in the event of a value of the acquired voltage of 4.2 V being exceeded, the battery pack is charged further in a third step with a constant voltage of 4.2 V. If, in the third step, a value of the charging current of 100 mA is fallen below, the charging process is ended. A third exemplary sequence of steps, in a first step, has a charging current of 12 A, wherein, in the event of a value of the acquired voltage of 3.9 V being exceeded or a value of the acquired temperature of 40° C. being exceeded, the charging current is reduced to a value of 10 A. In a second step of the third exemplary sequence of steps, in the event of a value of the acquired voltage of 4.0 V being exceeded or a value of the acquired temperature of 42° C. being exceeded, the charging current is reduced to a value of 8 A. In a third step of the third exemplary sequence of steps, in the event of a value of the acquired voltage of 4.1 V being exceeded or a value of the acquired temperature of 45° C. being exceeded, the charging current is reduced to a value of 6 A. In a fourth step of the third exemplary sequence of steps, in the event of a value of the acquired voltage of 4.2 V being exceeded, the battery pack is charged further in a fifth step at a constant voltage of 4.2 V. If, in the fifth step, a value of the charging current of 100 mA is fallen below, the charging process is ended. Other configurations of the sequence of steps are however also conceivable. Limit values of the voltage and/or of the temperature and/or values of the charging current are in particular dependent on a configuration of the battery pack to be charged. The values mentioned here of the charging current and the limit values of the voltage and/or of the temperature are preferably specified for a battery cell of the battery pack.

The communication unit preferably has at least one communication element for electrical and/or electronic connection to the battery pack. The communication element is preferably designed at least partially as an electrical contact and is in particular designed in one piece with the reception interface, in particular with an electrical contact of the reception interface, of the battery charger. The limit value, in particular typical for the battery, of the voltage and/or of the temperature is preferably transmitted via the communication element by way of an electrical and/or electronic signal. It is also conceivable for the communication unit, as an alternative or in addition, to have at least one in particular further communication element for wireless communication with the battery pack and/or an external unit. As an alternative or in addition, it is conceivable for the limit value, in particular typical for the battery, of the voltage and/or of the temperature to be transmitted wirelessly from the storage unit of the battery pack to the control and/or regulation unit via the communication unit. It is conceivable for the in particular further communication element to be designed for example as a near field communication (NFC) element, as a Bluetooth element, as a radio element, as a network adapter or the like. The communication unit, in particular the further communication element, is preferably intended to connect the battery charger and/or the battery pack to an external unit. "Intended" should be understood to mean in particular specifically configured, specifically designed and/or specifically equipped. An object being intended for a particular function should be understood to mean in particular that the object performs and/or carries out this particular function in at least one application state and/or operating state. The external unit is designed for example as a mobile device, in particular as a smartphone, as a cloud, as a server or the like. The communication unit, in particular the further communication element, is advantageously intended to connect the battery charger and/or the battery pack to the Internet and/or an intranet. The limit value of the voltage and/or of the temperature is preferably transmitted digitally. The communication unit is preferably designed at least partially as part of the battery charger. However, it is also conceivable for the communication unit to be designed at least partially as part of the battery pack and/or of the external unit. Advantageously, in at least one method step, the limit value, stored in particular in the storage unit of the battery pack and/or of the battery charger, of the voltage and/or of the temperature is stored and/or overwritten via the communication unit by way of the external unit. The storage unit is preferably part of the battery pack. However, it is also conceivable for the storage unit to be part of the external unit, in particular of the external unit designed as a cloud or server, wherein the limit value, in particular typical for the battery, of the voltage and/or of the temperature is transmitted from the external unit to the battery charger, in particular the control and/or regulation unit, by way of the communication unit when the battery pack is recognized by the acquisition unit and/or the battery charger.

Preferably, in at least one method step, in particular upon connection of the battery pack to the battery charger by way of the control and/or regulation unit, a request is made to the battery pack to transmit the limit value, in particular typical for the battery, of the voltage and/or of the temperature. The storage unit of the battery pack is designed in particular as a memory of a microcontroller of the battery pack or as a separate storage unit of the battery pack. Preferably, in at least one method step, the limit value of the voltage and/or of the temperature and/or the other limit value of the charging current are/is stored at least temporarily in a storage unit of the battery charger. Advantageously, in at least one method step, in particular before the charging process is started, a multiplicity of limit values of the temperature and/or of the voltage are transmitted by way of the communication unit, wherein the multiplicity of limit values are intended for a multiplicity of adaptations of the charging current during a charging process of the battery pack. The multiplicity of limit values are preferably stored at least temporarily in the storage unit of the battery charger and in particular progressively taken into consideration during the charging process of the battery pack by way of the control and/or regulation unit in order to adapt the charging current.

Preferably, in at least one method step, a structure and/or a type of the battery pack are/is transmitted to the control and/or regulation unit by way of the communication unit and/or acquired by way of the acquisition unit. The structure and/or the type of the battery pack are/is preferably taken into consideration by way of the control and/or regulation unit in order to adapt the charging current.

The configuration according to the disclosure of the method may enable advantageously individual fast charging of a battery pack, in particular since a charging process is able to be adapted to the respective battery pack. Advantageously fast charging of the battery pack is thereby able to be achieved. The configuration according to the disclosure allows an advantageously smooth charging process to be achieved. Advantageously user-specific fast charging of the battery pack may be achieved, in particular since a CV phase of the charging process is able to be bypassed. Overheating of the battery pack during fast charging is able to be largely avoided.

It is also proposed, in at least one method step, for the limit value, in particular typical for the battery, of the voltage to be adapted by way of the control and/or regulation unit on the basis of at least one internal resistance of the battery pack, in particular of the battery cell of the battery pack, transmitted from the battery pack via the communication unit. The internal resistance of the battery pack is advantageously ascertained and/or read out within the battery pack. The internal resistance of the battery pack is advantageously transmitted to the control and/or regulation unit by way of the communication unit, in particular before the charging process is started. The internal resistance of the battery pack is preferably stored in the battery charger by way of the control and/or regulation unit. The limit value of the voltage and/or of the temperature is advantageously adapted by way of the control and/or regulation unit using at least one algorithm stored in the battery charger and/or the battery pack and/or using a comparison with at least one database stored in the battery charger and/or the battery pack. The charging current is preferably adapted on the basis of a limit value, adapted on the basis of the internal resistance of the battery pack, of the voltage and/or of the temperature. As an alternative or in addition, it is conceivable, in at least one method step, for the internal resistance of the battery pack to be acquired, in particular periodically or continuously, by way of the acquisition unit, and to be transmitted to the control and/or regulation unit, in particular by way of the communication unit. The limit value of the voltage and/or of the temperature is advantageously increased, in comparison with a low internal resistance of the battery pack, by way of the control and/or regulation unit in the case of a high internal resistance of the battery pack, in particular of the battery cell of the battery pack, with a constant charging current. An exemplary sequence of steps for a charging process of a battery pack that comprises battery cells having an internal resistance of $R_{DC} \leq 30$ m$\Omega$ has, in a first step, a charging current of 8 A, wherein, in particular in the event of a value of the acquired voltage of 4.0 V being exceeded or a value of the acquired temperature of $47°$C being exceeded, the charging current is reduced to a value of 6 A. Preferably, in a second step of the sequence of steps, in the event of a value of the acquired voltage of 4.2 V being exceeded, the battery pack is charged further in a third step with a constant voltage of 4.2 V. If, in the third step, a value of the charging current of 100 mA is fallen below, the charging process is preferably ended. The charging current of the battery charger is advantageously reduced from 16 A to at least 12 A at a temperature of at least 42° C. by way of the control and/or regulation unit for a charging process of a battery pack that comprises in particular battery cells having an internal resistance of $R_{DC} \leq 20$ m$\Omega$. The charging current of the battery charger is preferably reduced from 12 A to at least 8 A at a temperature of at least 46° C. by way of the control and/or regulation unit for a charging process of a battery pack that comprises in particular battery cells having an internal resistance of $R_{DC} \leq 20$ m$\Omega$. The charging current of the battery charger is preferably reduced from 8 A to at least 6 A at a temperature of at least 48° C. by way of the control and/or regulation unit for a charging process of a battery pack that comprises in particular battery cells having an internal resistance of $R_{DC} \leq 20$ m$\Omega$. Preferably, for a charging process of a battery pack that comprises in particular battery cells having an internal resistance of $R_{DC} \leq 20$ m$\Omega$, in the event of a value of the acquired voltage of 4.2 V being exceeded, the battery pack is charged further with a constant voltage of 4.2 V by way of the control and/or regulation unit, wherein the charging process is ended in particular if a value of the charging current of 100 mA is fallen below. One exemplary sequence of steps for a charging process of a battery pack that comprises battery cells having an internal resistance of $R_{DC} \leq 20$ mΩ preferably has, in a first step, a charging current of 12 A, wherein, in particular in the event of a value of the acquired voltage of 3.95 V being exceeded or a value of the acquired temperature of 42° C. being exceeded, the charging current is reduced to a value of 6 A. Preferably, in a second step of the sequence of steps, in the event of a value of the acquired voltage of 4.2 V being exceeded, the battery pack is charged further in a third step with a constant voltage of 4.2 V. If, in the third step, a value of the charging current of 100 mA is fallen below, the charging process is preferably ended. One exemplary sequence of steps for a charging process of a battery pack that comprises battery cells having an internal resistance of $R_{DC} \leq 15$ mΩ preferably has, in a first step, a charging current of at least 22 A, wherein, in particular in the event of a value of the acquired voltage of at least 3.7 V being exceeded or a value of the acquired temperature of 40° C. being exceeded, the charging current is reduced to a value of at least 16 A. Preferably, in a second step, in the event of a value of the acquired voltage of at least 3.95 V being exceeded or a value of the acquired temperature of 43° C. being exceeded, the charging current is reduced to a value of 10 A. Preferably, in a third step, in the event of a value of the acquired voltage of at least 4.15 V being exceeded or a value of the acquired temperature of 47° C. being exceeded, the charging current is reduced to a value of 6 A. Preferably, in a fourth step, in the event of a value of the acquired voltage of 4.2 V being exceeded, the battery pack is charged further in a fifth step with a constant voltage of 4.2 V. If, in the fifth step, a value of the charging current of 100 mA is fallen below, the charging process is preferably ended. Other configurations of the sequence of steps are however also conceivable. Limit values of the voltage and/or of the temperature and/or values of the charging current are in particular dependent on a configuration of the battery pack to be charged. The configuration according to the disclosure of the method may allow an advantageously fast charging process in a manner specific to the battery, even in the case of frequently used battery packs, in particular since an aging-induced changeable internal resistance is able to be taken into consideration.

It is additionally proposed, in at least one method step, for an internal resistance of the battery pack, ascertained by the battery charger and taken into consideration when adapting the limit value, in particular typical for the battery, of the voltage to be transmitted to the battery pack by way of the communication unit and stored in a storage unit of the battery pack. The internal resistance of the battery pack is preferably transmitted and stored during or after a charging process. It is conceivable, in at least one method step, for the internal resistance of the battery pack ascertained by the battery charger to be compared with a limit value of the internal resistance, in particular by way of the control and/or regulation unit. A signal is preferably transmitted to an external unit and/or the battery pack by way of the communication unit on the basis of a comparison of the internal resistance with the limit value of the internal resistance, in particular in order to signal an end of a service life and/or harmless charging of the battery pack. The limit value of the internal resistance is in particular stored in the storage unit. The limit value of the internal resistance is preferably defined by a manufacturer of the battery pack and/or a user. The configuration according to the disclosure of the method may allow advantageously simple monitoring of battery packs, in particular with regard to a state of health and/or a service life. It is possible to achieve advantageously high user convenience, in particular since a battery pack is able to be taken out of service before an insufficient performance and/or operating time is reached.

It is furthermore proposed, in at least one method step, for a number of charging cycles of the battery pack to be transmitted to the control and/or regulation unit, in particular by way of the communication unit, wherein the number of charging cycles is taken into consideration by way of the control and/or regulation unit when adapting the charging current. Preferably, starting from a predefined and/or user-specific number of charging cycles, the limit value of the voltage and/or of the temperature is adapted by way of the control and/or regulation unit in order to adapt the charging current. By way of example, for a battery pack having at least 100 charging cycles, in the first step of the first exemplary sequence of steps, the charging current is already reduced from 8 A to a value of 6 A in the event of a value of the acquired voltage of 4.0 V being exceeded or a value of the acquired temperature of 40° C. being exceeded. In particular, in the second step of the first exemplary sequence of steps, for a battery pack having at least 100 charging cycles, in the event of a value of the acquired voltage of 4.15 V being exceeded, the battery pack is charged further in the third step with a constant voltage of 4.2 V. If a value of the charging current of 150 mA is fallen below for a battery pack having at least 100 charging cycles in the third step, the charging process is preferably ended. As an alternative or in addition, it is conceivable, in particular instead of the limit value of the voltage and/or of the temperature, for the charging current of the battery charger to be adapted on the basis of the number of charging cycles of the battery pack. By way of example, for a battery pack having at least 100 charging cycles, in the first step of the first exemplary sequence of steps, the charging current is reduced from 7 A to a value of 5 A in the event of a value of the acquired voltage of 4.1 V being exceeded or a value of the acquired temperature of 45° C. being exceeded. In particular, in the second step of the first exemplary sequence of steps, for a battery pack having at least 100 charging cycles, in the event of a value of the acquired voltage of 4.2 V being exceeded, the battery pack is charged further in the third step with a constant voltage of 4.2 V. The configuration according to the disclosure of the method makes it possible to achieve an advantageously smooth charging process of the battery pack, in particular since the loading of the battery pack is able to be adapted on the basis of aging of the battery pack. An advantageously long service life of the battery pack may be made possible. Advantageously fast charging of already aged battery packs may be achieved. Advantageously fast aging-specific adaptation of the charging process may be made possible.

It is furthermore proposed, in at least one method step, for at least one number of charging cycles, taken into consideration when adapting the charging current and in particular acquired by way of the battery charger, to be transmitted to the battery pack by way of the communication unit and stored in a storage unit of the battery pack. The number of charging cycles of the battery pack is preferably dependent on a charging process of the battery pack. By way of example, in the case of charging the battery pack to 10% to 50% of a total capacity of the battery pack, in particular by way of the control and/or regulation unit, a half charging cycle is counted and added to a number of charging cycles. Advantageously, in the case of charging the battery pack to at least 50% of the total capacity of the battery pack, in particular by way of the control and/or regulation unit, a whole charging cycle is counted and added to a number of charging cycles. It is conceivable, in at least one method step, for the number of charging cycles of the battery pack to be compared with a limit value of the charging cycles, in particular by way of the control and/or regulation unit. Preferably, on the basis of a comparison of the number of charging cycles of the battery pack with the limit value of the charging cycles, a signal is transmitted to an external unit and/or the battery pack by way of the communication unit, in particular in order to signal an end of a service life and/or harmless charging of the battery pack. In addition or as an alternative, it is conceivable, upon reaching a limit value of the charging cycles, in particular using the battery pack, for a further charging process to be at least substantially avoided. It is conceivable, together with the number of charging cycles, for further information, such as for example a serial number of the battery charger, a profile of the charging current of the charging process or the like to be transmitted to the battery pack by way of the communication unit and stored in the storage unit of the battery pack. The configuration according to the disclosure of the method advantageously makes it possible to easily adapt fast charging of the battery pack to aging, in particular to a state of health of the battery pack, in particular since the number of charging cycles is stored in the battery pack. Advantageously accurate and simple monitoring of aging of battery packs may be achieved. Advantageously simple monitoring of battery packs may be performed, in particular in terms of a service life.

It is additionally proposed, in at least one method step, at a charging current of at least 14 A, for at least one limit value, transmitted from a storage unit of the battery pack and/or of the battery charger by way of the communication unit, in particular typical for the battery, of the temperature of at least 40° C. and/or limit value of the voltage between 3.8 V and 4.05 V to be taken into consideration in order to adapt the charging current. Preferably, in at least one method step, at a charging current between 14 A and 18 A, at least one limit value, transmitted from a storage unit of the battery pack and/or of the battery charger by way of the communication unit, in particular typical for the battery, of the temperature of at least 40° C. and/or limit value of the voltage between 3.8 V and 4.05 V is taken into consideration in order to adapt the charging current. Preferably, at a value of the acquired temperature of 40° C., 42° C., 46° C. or 47° C., the charging current is reduced to a value of 6 A, 8 A or 10 A by way of the control and/or regulation unit. The configuration according to the disclosure of the method may allow an advantageously fast charging process.

It is also proposed, in at least one method step, at a charging current of at least 10 A, for at least one limit value, transmitted from a storage unit of the battery pack and/or of the battery charger by way of the communication unit, in particular typical for the battery, of the temperature of at least 42° C. and/or limit value of the voltage between 3.9 V and 4.15 V to be taken into consideration in order to adapt the charging current. Preferably, in at least one method step, at a charging current between 10 A and 14 A, at least one limit value, transmitted from a storage unit of the battery pack and/or of the battery charger by way of the communication unit, in particular typical for the battery, of the temperature of at least 42° C. and/or limit value of the voltage between 3.9 V and 4.15 V is taken into consideration in order to adapt the charging current.

Preferably, at a value of the acquired temperature of 42° C. or 47° C., the charging current is reduced to a value of 6 A or 8 A by way of the control and/or regulation unit. The configuration according to the disclosure of the method may allow an advantageously fast charging process.

It is also proposed, in at least one method step, at a charging current of at least 6 A, for at least one limit value, transmitted from a storage unit of the battery pack and/or of the battery charger by way of the communication unit, in particular typical for the battery, of the temperature of at least 45° C. and/or limit value of the voltage between 4 V and 4.2 V to be taken into consideration in order to adapt the charging current. Preferably, in at least one method step, at a charging current between 6 A and 10 A, at least one limit value, transmitted from a storage unit of the battery pack and/or of the battery charger by way of the communication unit, in particular typical for the battery, of the temperature of at least 45° C. and/or limit value of the voltage between 4 V and 4.2 V is taken into consideration in order to adapt the charging current. Preferably, at a value of the acquired temperature of 45° C. or 48° C., the charging current is reduced to a value of 6 A by way of the control and/or regulation unit. However, it is also conceivable, in particular if a limit value for the number of charging cycles is reached, for the limit value of the temperature to be 40° C. or 45° C. The configuration according to the disclosure of the method may allow an advantageously fast charging process.

It is additionally proposed, in at least one method step, in the event of the limit value, in particular typical for the battery, of the voltage and/or of the temperature being exceeded or fallen below, for at least one optical, acoustic and/or haptic signal to be output by way of an output unit of the battery charger and/or for a signal to be transmitted to an external unit and/or the battery pack by way of an in particular wireless communication unit of the battery charger. Preferably, if the acquired temperature reaches a value of 60° C., particularly preferably 50° C., at least one optical, acoustic and/or haptic signal is output by way of the output unit and/or a signal is transmitted to an external unit and/or the battery pack by way of the communication unit. The signal transmitted to the external unit and/or the battery pack is advantageously designed as a digital data packet, such as for example a programming command, a database entry or the like. The signal output via the output unit is preferably designed as speech, as a signal tone, as a light, as a vibration or the like. The external unit is preferably a mobile device, in particular a smartphone, a cloud, a server or the like. The signal advantageously comprises further information about the charging process, such as for example an instantaneous charging current, an instantaneous temperature, an instantaneous voltage, a remaining charging time, in particular estimated and/or calculated by way of the control and/or regulation unit, an instantaneous state of charge of the battery pack or the like. The signal preferably stores a sequence of the charging process on the battery pack and/or the external unit. The configuration according to the disclosure of the method may allow an advantageously high level of user friendliness, in particular since a user is advantageously easily able to follow the charging process. Advantageously external monitoring of the charging process may be made possible. Advantageously simple documentation and/or monitoring of the charging process may be achieved.

Also proposed is a battery charger for adaptive fast charging of a battery pack, in particular of an interchangeable battery pack for electric machine tools, for performing a method according to the disclosure, wherein the battery charger comprises at least one control and/or regulation unit and at least one in particular wireless communication unit. The battery charger preferably has an acquisition unit that is intended to periodically or continuously acquire a voltage and/or a temperature of the battery pack, in particular of a battery cell of the battery pack. The acquisition unit preferably has at least one acquisition element designed as an electrical contact. The acquisition unit is preferably intended to periodically or continuously acquire a charging current flowing from the battery charger to the battery pack. The communication unit is preferably connected, in particular conductively, to the control and/or regulation unit. The communication unit is advantageously intended to transmit digital data to the battery pack and/or an external unit. The battery charger preferably comprises at least one reception interface that is designed in a manner corresponding at least partially to an interface of the battery pack. The battery charger is preferably electrically connected to the battery pack, in particular at least one battery cell of the battery pack, via the reception interface. The reception interface is preferably intended to connect the battery charger detachably to the battery pack, in particular mechanically, frictionally and/or in a form-fitting manner. The acquisition element and/or the communication element are/is particularly preferably designed in one piece with the reception interface. The configuration according to the disclosure of the battery charger may be used to perform an advantageously fast and battery pack-specific fast charging process.

The method according to the disclosure and/or the battery charger according to the disclosure should not be understood here as being restricted to the application and embodiment described above. The method according to the disclosure and/or the battery charger according to the disclosure may in particular have one of a number of individual elements, components and units mentioned herein and various numbers of method steps in order to comply with a mode of operation described herein. In the ranges of values specified in this disclosure, values located within the stated limits should also be considered to be disclosed and to be able to be used as desired.

BRIEF DESCRIPTION OF THE DRAWINGS

Further advantages will become apparent from the following description of the drawing. The drawing illustrates one exemplary embodiment of the disclosure. The drawing, the description and the claims contain numerous features in combination. A person skilled in the art will expediently also consider the features individually and combine them to give feasible further combinations.

In the figures.

DETAILED DESCRIPTION

Figure 1:
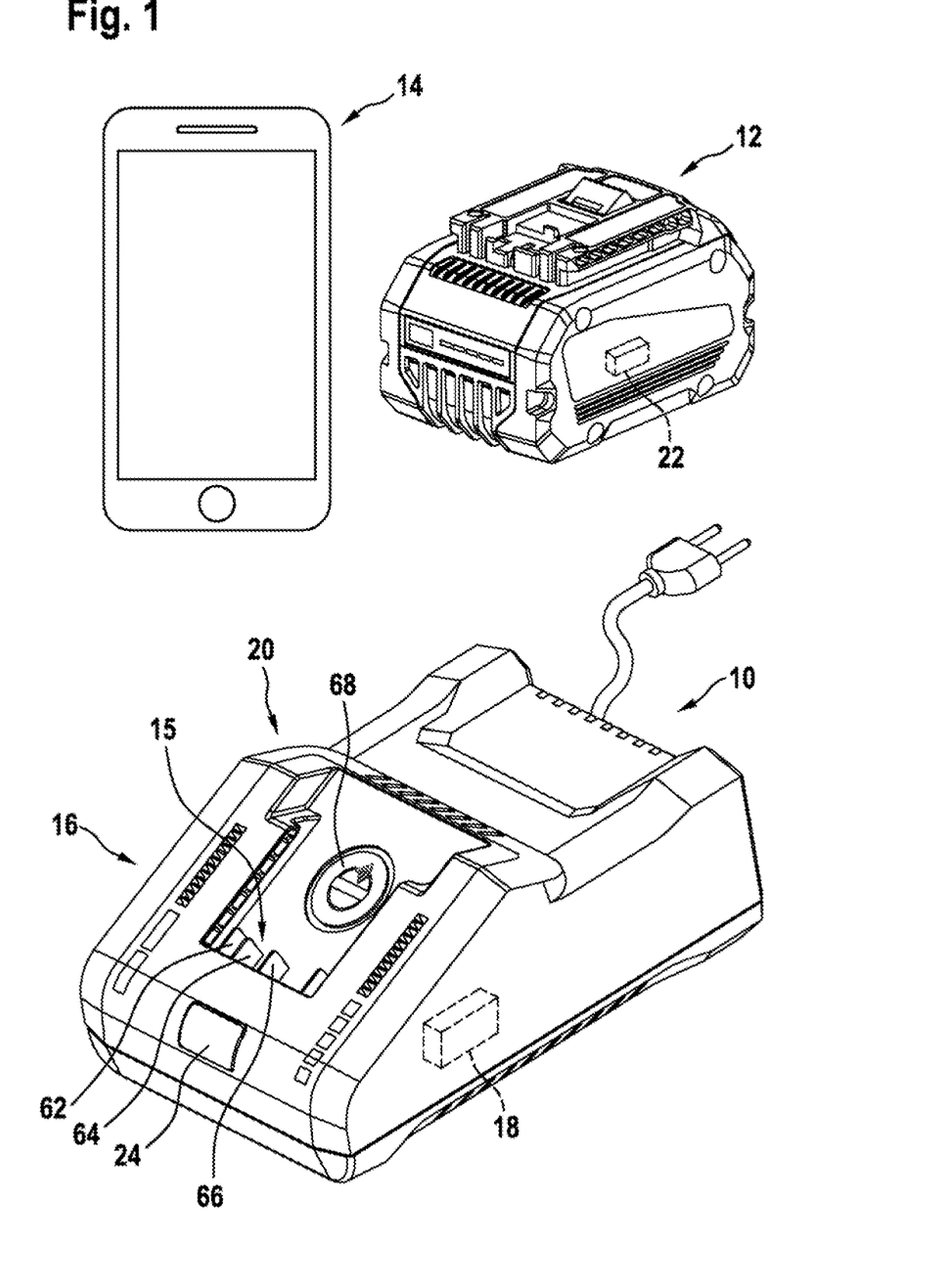
FIG. 1 shows a schematic illustration of a system containing at least one battery charger according to the disclosure for adaptive fast charging of a battery pack for performing a method according to the invention, wherein the system has an external unit.

FIG. 1 shows a system containing at least one battery charger 10 for adaptive fast charging of a battery pack 12. The system preferably comprises the battery pack 12, designed in a manner corresponding to a reception interface 15 of the battery charger 10, and an external unit 14, designed for example as a smartphone. The battery pack 12 is designed as an interchangeable battery pack for electric machine tools. The battery charger 10 has at least one housing unit. The battery charger 10 comprises the reception interface 15, which is designed in a manner corresponding at least partially to an interface of the battery pack 12. The reception interface 15 comprises at least one contact element 62 for transmitting at least one charging current from the battery charger 10 to the battery pack 12. The battery charger 10 comprises an acquisition unit 16 that is intended to continuously or periodically acquire at least one voltage and/or one temperature of the battery pack 12, in particular of a battery cell of the battery pack 12. The acquisition unit 16 is preferably intended to periodically or continuously acquire a charging current of the battery charger 10. The acquisition unit 16 is advantageously arranged on a side of the housing unit facing the reception interface 15. The acquisition unit 16 has at least one acquisition element 64 for acquiring the parameter of the battery pack 12, which acquisition element is designed in one piece with the reception interface 15. The acquisition element 64 is designed at least partially as an electrical contact that is connected, in particular electrically and/or electronically, to the battery pack 12, in particular when the battery pack 12 is received in order to charge the battery pack 12 in the reception interface 15. The acquisition element 64 is preferably designed as a contact element of the reception interface 15. However, other configurations of the acquisition unit 16, in particular of the acquisition element 64, are also conceivable. However, it is also conceivable for the battery pack 12 to contain the acquisition unit 16. The battery charger 10 comprises a control and/or regulation unit 18 that is intended to adapt the charging current of the battery charger 10 on the basis of the acquired voltage and/or of the acquired temperature of the battery pack 12 and to take into consideration at least one limit value, in particular typical for the battery, of the voltage and/or of the temperature in order to adapt the charging current. The battery charger 10 comprises a communication unit 20 that is intended to transmit at least one limit value, in particular typical for the battery, of the voltage and/or of the temperature from a storage unit 22 of the battery pack 12 and/or of the battery charger 10 to the control and/or regulation unit 18, in particular wirelessly. The communication unit 20 advantageously has at least one communication element 66 that is designed as an electrical contact and is intended for electrical and/or electronic connection to the battery pack 12. The communication element 66 is designed in one piece with the reception interface 15. The communication element 66 is preferably designed as a contact element of the reception interface 15. The communication element 66 is preferably connected, in particular electrically and/or electronically, to the battery pack 12 when the battery pack 12 is received in order to charge the battery pack 12 in the reception interface 15. However, other configurations of the communication element 66 are also conceivable. The communication unit 20 preferably has a further communication element 68 that is intended to wirelessly connect the battery charger 10 to the external unit 14 and/or the battery pack 12. The further communication element 68 is preferably arranged on a side of the housing unit facing the reception interface 15. In FIG. 1, the storage unit 22 is shown as part of the battery pack 12. However, it is also conceivable for the storage unit 22 to be part of the battery charger 10 and/or of the external unit 14. It is conceivable for the external unit 14 to be intended to monitor a charging process via the communication unit 20 and/or to store at least one limit value of the voltage and/or of the temperature. By way of example, the communication unit 20, in particular the further communication element 68, is designed at least partially as a near field communication (NFC) unit, as a Bluetooth system, as a radio system, as a network adapter or the like. The communication unit 20, in particular the further communication element 68, is preferably intended to connect the battery charger 10 and/or the battery pack 12 to the external unit 14. It is also conceivable for the external unit 14 and/or a further external unit to be designed as a mobile device of a different design, as a cloud, as a server or the like, wherein the communication unit 20, in particular the further communication element 68, is in particular intended to connect the battery charger 10 and/or the battery pack 12 to a network. The communication unit 20, in particular the further communication element 68, is preferably intended to connect the battery charger 10 and/or the battery pack 12 to the Internet and/or an intranet. As an alternative or in addition, it is conceivable for the communication unit 20, in particular the further communication element 68, to be intended to transmit the at least one limit value of the voltage and/or of the temperature from the external unit 14 and/or the further external unit to the control and/or regulation unit 18, preferably on the basis of a type and/or serial number of the battery pack 12, in particular acquired by way of the acquisition unit 16. The battery charger 10 comprises an output unit 24 that is intended, in the event of the limit value, in particular typical for the battery, of the voltage and/or of the temperature being exceeded or fallen below, to output at least one optical, acoustic and/or haptic signal.

Figure 2:
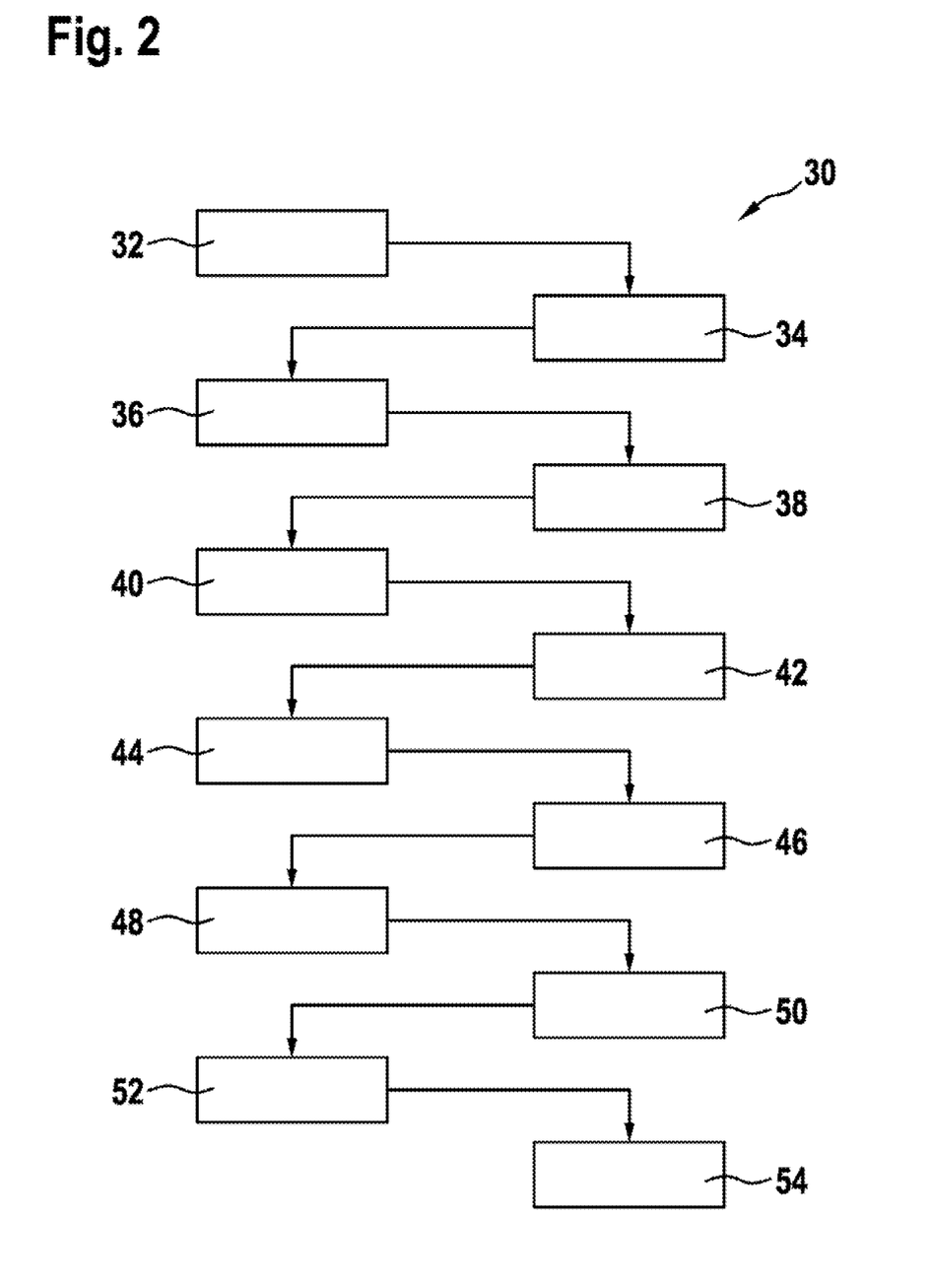
FIG. 2 shows a schematic illustration of a sequence of the method according to the disclosure for adaptive fast charging of a battery pack and FIG. 3 shows a schematic illustration of a profile of a charging current during an exemplary charging process in accordance with the method according to the disclosure.

FIG. 2 shows an exemplary sequence of a method 30 for adaptive fast charging of the battery pack 12. In at least one method step 32 of the method 30, at least one voltage and one temperature of the battery pack 12, in particular of a battery cell of the battery pack 12, are recorded continuously or periodically by way of the acquisition unit 16. In at least one further method step 34 of the method 30, a charging current of the battery charger 10 is adapted by way of the control and/or regulation unit 18 of the battery charger 10 on the basis of the acquired voltage and/or of the acquired temperature of the battery pack 12. In at least one further method step 36 of the method 30, at least one limit value, in particular typical for the battery, of the voltage and/or of the temperature is taken into consideration by way of the control and/or regulation unit 18 in order to adapt the charging current. In at least one further method step 38 of the method 30, in particular before the charging process is started, the limit value, in particular typical for the battery, of the voltage and/or of the temperature is transmitted from the storage unit 22 of the battery pack 12 and/or of the battery charger 10 to the control and/or regulation unit 18 by way of the in particular wireless communication unit 20. In at least one further method step 40 of the method 30, the limit value, in particular typical for the battery, of the voltage is adapted by way of the control and/or regulation unit 18 on the basis of at least one internal resistance of the battery pack 12 transmitted from the battery pack 12 via the communication unit 20. In at least one method step 42 of the method 30, an internal resistance of the battery pack 12, ascertained by the battery charger 10 and taken into consideration when adapting the limit value, in particular typical for the battery, of the voltage, is transmitted to the battery pack 12 by way of the communication unit 20 and stored in the storage unit 22 of the battery pack 12. In at least one further method step 44 of the method 30, a number of charging cycles of the battery pack 12 is transmitted to the control and/or regulation unit 18, in particular by way of the communication unit 20, wherein the number of charging cycles is taken into consideration by way of the control and/or regulation unit 18 when adapting the charging current. In at least one further method step 46 of the method 30, at least one number of charging cycles, taken into consideration when adapting the charging current and in particular acquired by way of the battery charger 10, is transmitted to the battery pack 12 by way of the communication unit 20 and stored in the storage unit 22 of the battery pack 12. In at least one further method step 48 of the method 30, at a charging current of at least 14 A, at least one limit value, transmitted from the storage unit 22 of the battery pack 12 and/or of the battery charger 10 by way of the communication unit 20, in particular typical for the battery, of the temperature of at least 40° C. and/or limit value of the voltage between 3.8 V and 4.05 V is taken into consideration in order to adapt the charging current. In at least one further method step 50 of the method 30, at a charging current of at least 10 A, at least one limit value, transmitted from the storage unit 22 of the battery pack 12 and/or of the battery charger 10 by way of the communication unit 20, in particular typical for the battery, of the temperature of at least 42° C. and/or limit value of the voltage between 3.9 V and 4.15 V is taken into consideration in order to adapt the charging current. In at least one further method step 52 of the method 30, at a charging current of at least 6 A, at least one limit value, transmitted from the storage unit 22 of the battery pack 12 and/or of the battery charger 10 by way of the communication unit 20, in particular typical for the battery, of the temperature of at least 45° C. and/or limit value of the voltage between 4 V and 4.2 V is taken into consideration in order to adapt the charging current. In at least one further method step 54 of the method 30, in the event of the limit value, in particular typical for the battery, of the voltage and/or of the temperature being exceeded or fallen below, at least one optical, acoustic and/or haptic signal is output by way of the output unit 24 of the battery charger 10 and/or a signal is transmitted to the external unit 14 and/or the battery pack 12 by way of the in particular wireless communication unit 20 of the battery charger 10.

Figure 3:
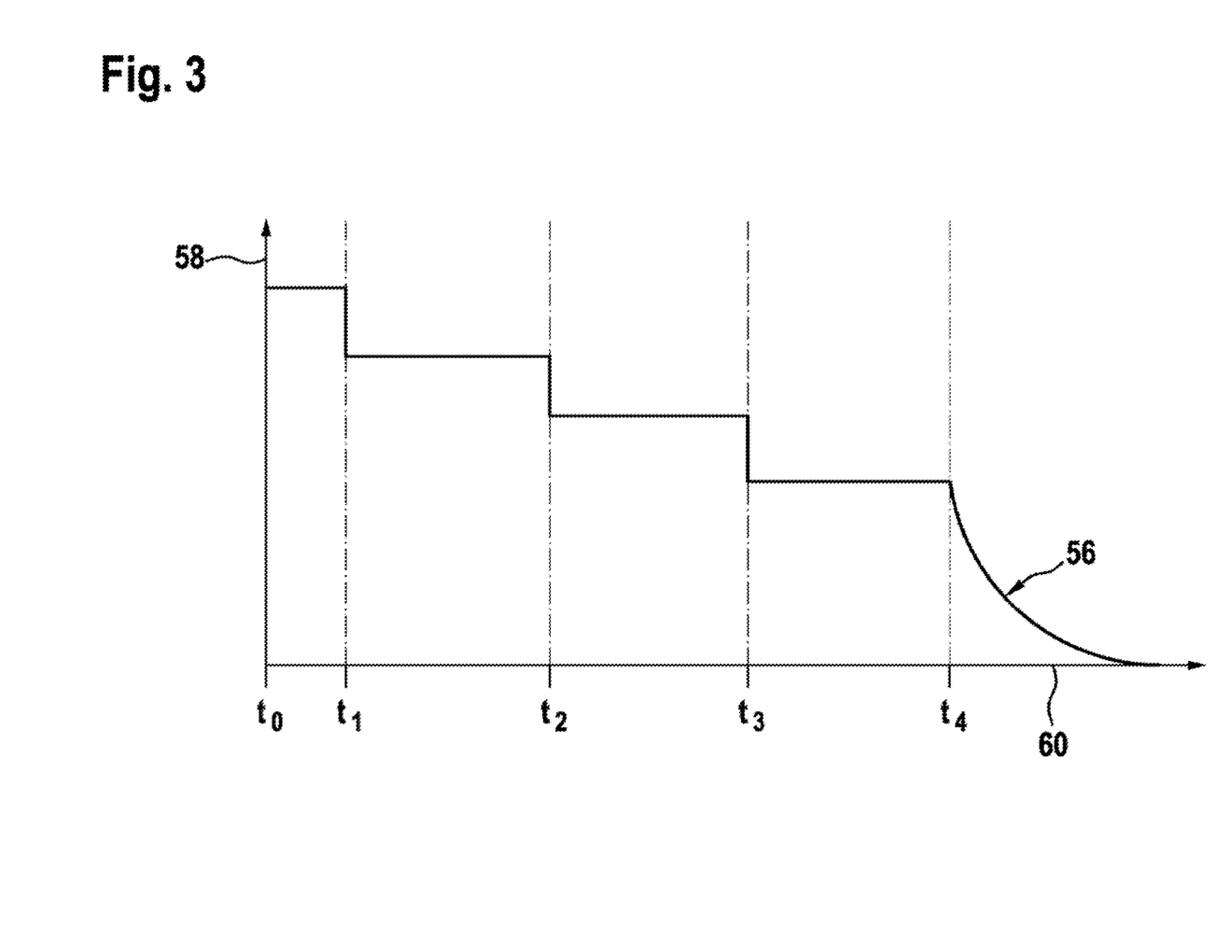

FIG. 3 shows a profile of a charging current 56 during an exemplary charging process of the battery pack 12 by way of the battery charger 10 in accordance with the method 30. The charging current 56 is plotted on the ordinate 58. The abscissa 60 represents time. The charging process of the battery pack 12 starts at a time $t_0$. From the time $t_0$ to a further time $t_1$, the battery pack 12 is charged with a charging current 56 of 12 A. At the further time $t_1$, a temperature of the battery pack 12 of 40° C. and/or a voltage of the battery pack 12 of 3.9 V is acquired by way of the acquisition unit 16. The charging current 56 is reduced to 10 A at the further time $t_1$ by way of the control and/or regulation unit 18. A temperature of the battery pack 12 of 42° C. and/or a voltage of the battery pack 12 of 4.0 V is acquired by way of the acquisition unit 16 at a time $t_2$. The charging current 56 is reduced to 8 A at the time $t_2$ by way of the control and/or regulation unit 18. A temperature of the battery pack 12 of 45° C. and/or a voltage of the battery pack 12 of 4.1 V is acquired by way of the acquisition unit 16 at a time $t_3$. The charging current 56 is reduced to 6 A at the time $t_3$ by way of the control and/or regulation unit 18. A voltage of the battery pack 12 of 4.2 V is acquired by way of the acquisition unit 16 at a time $t_4$. The battery pack 12 is charged with a constant voltage of 4.2 V by way of the control and/or regulation unit 18 starting from the time $t_4$ until the charging current 56 drops to a value of less than 100 mA, at which point the charging process is ended. However, other configurations of the sequence of a charging process of the battery pack 12 in accordance with the method 30 are also conceivable.

The invention claimed is:

1. A method for adaptive fast charging of a battery pack using a battery charger, the method comprising:
   acquiring at least one voltage and at least one temperature of the battery pack, one of continuously and periodically using an acquisition device;
   adapting a charging current of the battery charger using a controller of the battery charger based on at least one of the at least one voltage and the at least one temperature of the battery pack, and based on at least one limit value of at least one of (i) the at least one voltage and (ii) the at least one temperature; and
   transmitting the at least one limit value of the at least one of (i) the at least one voltage and (ii) the at least one temperature from a storage device of at least one of the battery pack and the battery charger to the controller using a communication device.

2. The method as claimed in claim 1, further comprising:
   adapting the at least one limit value of the at least one voltage using the controller based on at least one internal resistance of the battery pack, which is transmitted from the battery pack via the communication device.

3. The method as claimed in claim 1, further comprising:
   ascertaining an internal resistance of the battery pack using the battery charger, the at least one limit value of the voltage being adapted based on the internal resistance of the battery pack;
   transmitting the internal resistance of the battery pack to the battery pack using the communication device; and
   storing the internal resistance of the battery pack in the storage device of the battery pack.

4. The method as claimed in claim 1, further comprising:
   transmitting a number of charging cycles of the battery pack to the controller using the communication device, the charging current being adapted based on the number of charging cycles using the controller.

5. The method as claimed in claim 1, further comprising:
   acquiring at least one number of charging cycles the using the battery charger, the charging current being adapted based on the at least one number of charging cycles;
   transmitting the at least one number of charging cycles to the battery pack using the communication device; and
   storing the at least one number of charging cycles in the storage device of the battery pack.

6. The method as claimed in claim 1, further comprising:
   adapting the charging current, at a charging current of at least 14 A, based on the at least one limit value, which is transmitted from the storage device using the communication device, the at least one limit value being at least one of (i) a limit value of the at least one temperature of at least 40° C. and (ii) a limit value of the at least one voltage between 3.8 V and 4.05 V.

7. The method as claimed in claim 1, further comprising:
   adapting the charging current, at a charging current of at least 10 A, based on the at least one limit value, which is transmitted from the storage device using the communication device, the at least one limit value being at least one of (i) a limit value of the at least one temperature of at least 42° C. and (ii) a limit value of the at least one voltage between 3.9 V and 4.15 V.

8. The method as claimed in claim 1, further comprising:
   adapting the charging current, at a charging current of at least 6 A, based on the at least one limit value, which is transmitted from the storage device using the communication device, the at least one limit value being at least one of (i) a limit value of the at least one temperature of at least 45° C. and (ii) a limit value of the at least one voltage between 4 V and 4.2 V.

9. The method as claimed in claim 1, further comprising:
   in response to the at least one limit value of the at least one of (i) the at least one voltage and (ii) the at least one temperature being one of exceeded and fallen below, at least one of:
   outputting at least one of an optical signal, an acoustic signal, and a haptic signal using an output device of the battery charger and/or
   transmitting a signal to at least one of an external device and the battery pack using the communication device of the battery charger.

10. A battery charger for adaptive fast charging of a battery pack, the battery charger comprising:
    at least one communication unit; and
    at least one controller configured to:
       acquiring at least one voltage and at least one temperature of the battery pack, one of continuously and periodically using an acquisition device;
       adapting a charging current of the battery charger using a controller of the battery charger based on at least one of the at least one voltage and the at least one temperature of the battery pack, and based on at least one limit value of at least one of (i) the at least one voltage and (ii) the at least one temperature; and
       transmitting the at least one limit value of the at least one of (i) the at least one voltage and (ii) the at least one temperature from a storage device of at least one of the battery pack and the battery charger to the controller using the at least one communication device.

11. The battery charger as claimed in claim 10, wherein the battery pack is an interchangeable battery pack configured for use with electric machine tools.

12. The battery charger as claimed in claim 10, wherein the at least one communication device is at least one wireless communication device.

13. The method as claimed in claim 1, wherein the battery pack is an interchangeable battery pack configured for use with electric machine tools.

14. The method as claimed in claim 1, wherein the at least one voltage and at least one temperature of the battery pack are at least one voltage and at least one temperature of a battery cell of the battery pack.

15. The method as claimed in claim 1, wherein the at least one limit value of the at least one of (i) the at least one voltage and (ii) the at least one temperature is typical for the battery.

16. The method as claimed in claim 1, wherein the transmitting the at least one limit value of the at least one of (i) the at least one voltage and (ii) the at least one temperature is performed before a charging process is started.

17. The method as claimed in claim 1, wherein the communication device is a wireless communication device.

* * * * *